May 15, 1951      L. R. MILLER      2,552,730

FISH LURE

Filed Dec. 10, 1948

INVENTOR.
Leon R. Miller
BY
McMorrow, Berman & Davidson
ATTORNEYS

Patented May 15, 1951

2,552,730

UNITED STATES PATENT OFFICE 2,552,730

FISH LURE

Leon R. Miller, Hot Springs, Ark.

Application December 10, 1948, Serial No. 64,641

2 Claims. (Cl. 43—42.31)

My invention relates to fish lures of the type comprising an artificial bait adapted to be drawn through the water by a fish line. Such lures are well known and include numerous means for imparting lifelike movement to the lure for the purpose of attracting fish. Moreover, such lures frequently include means movable relative to the lure and actuated by the movement of the lure through the water for attracting the attention of fish. Thus, such lures appeal to the eyes of the fish, whereby the attraction of the fish is purely visual. As is well known, all fish include organs corresponding to human ears. While it is believed that such organs are incapable of actually hearing sounds within the meaning of the term as generally used, it is well known that such organs are sensitive to sound waves, particularly sound waves transmitted through the water. Likewise, as is well known, water provides an excellent medium for the transmission of sound waves. Also, as is well known, a rapidly-vibrating spring, particularly a resonant spring, such as a leaf spring, is an excellent medium for creating sound waves.

With the foregoing in view, it is an object of my invention to provide an improved fish lure which includes means mounted thereon for transmitting sound waves through the water together with means for actuating selectively said sound wave-creating means.

A further object is to provide an improved fish lure such as that last described, wherein the fish line is operatively connected to the sound wave-generating means whereby to actuate the latter in response to a pull on the fish line.

A further object is to provide an improved fish lure which has a resonant spring mounted therein in exposed relation to the water, together with means operatively connected to a fish line and engageable with said spring to trip the same responsive to a pull on the fish line whereby to impart rapid vibrations to the spring so as to transmit sound waves to the water.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

Figure 1:
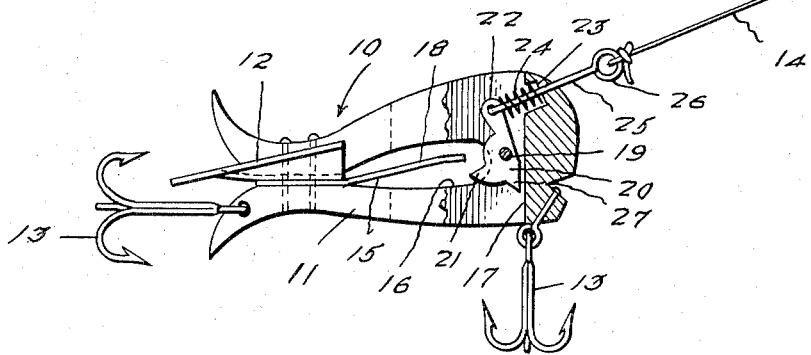
Figure 1 is an elevational view of a lure according to the invention, parts being broken away and shown in longitudinal vertical section.
Figure 2:
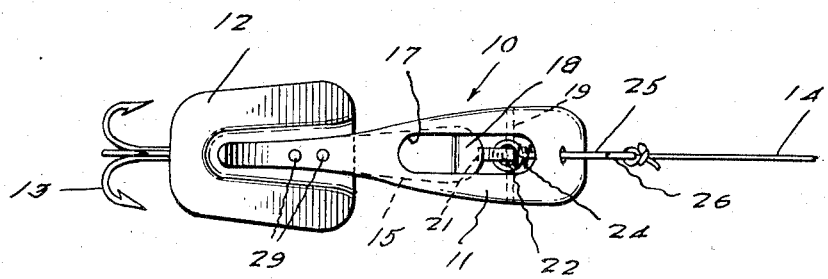
Figure 2 is a plan view thereof.
Figure 3:
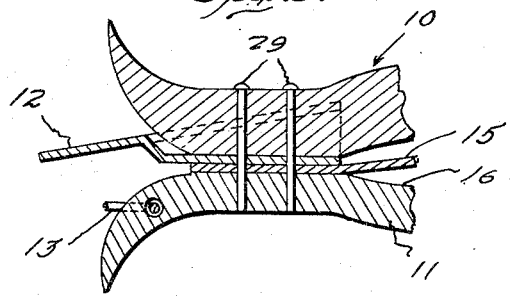
Figure 3 is an enlarged fragmentary longitudinal vertical sectional view through the rear end of the lure.
Figure 4:
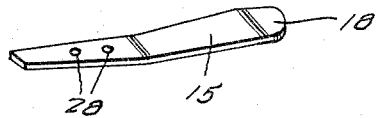
Figure 4 is a perspective view of the sound wave-producing element of the lure apart from the rest of the structure.

Referring specifically to the drawing, wherein like reference characters have been used throughout the several views to designate like parts, the lure according to the invention is generally indicated at 10 and includes a body 11 of any suitable well known form. The body 11 may have secured thereto a suitable vane 12 for imparting a desired motion to the lure 10 as the same is drawn through the water by a fish line 14. In the embodiment illustrated, the vane 12 is attached to the rear end of the body and so disposed as to impart a diving movement to the lure as the same is drawn through the water. Also, the lure body 11 may have secured thereto a suitable hook 13.

The lure according to the invention contemplates the mounting on the body 11 thereof of a resonant vibrator together with means for selectively actuating the same. Thus, the vibrator may comprise a resonant leaf spring 15 which is mounted in an elongated opening 16 formed in the lure body 11 longitudinally thereof. The opening 16 may be closed at the front and rear ends, but preferably opens laterally through both sides of the body 11. Also, in the form illustrated the body 11 is formed with a vertically-directed opening or slot 17 therethrough from its bottom to top which communicates with at least the forward portion of the opening 16. The vibrator spring 15 is mounted in the opening 16 and extends longitudinally for a portion of the length of said side opening so as to provide a free front end 18 in spaced relation to the sides of said opening 16 and located adjacent the front end of the opening 16, but within the opening or slot 17. The rear end of the spring 15 may be provided with openings 28 whereby pins 29 may be passed through the same and the lure body 11 to anchor the rear end of the spring to the lure body.

To impart vibrations to the free end 18 of the spring 15, there has been provided a tripper now to be described.

Thus, a pintle 19 extends transversely across the opening or slot 17 forwardly of the forward end of the opening 16. The outer ends of the pintle 19 are embedded in the lure body and a tripper 20 is pivotally mounted thereon inwardly of the opening or slot 17. The tripper 20 comprises a pawl which includes a dog 21 projecting rearwardly into the front portion of the opening 16 so as to engage the free front end 18 of the spring 15. The tripper 20 likewise includes an upwardly-directed arm 22, the upper end of which is pivotally connected to a forwardly-directed link 25 which is slidably mounted in the front end of the lure body. The link 25 includes a front end extending forwardly out of the lure body and formed to provide an eye 26 for attachment to the fish line 14. A cylindrical recess 23 is formed in the lure body and opens into the upper portion of the opening or slot 17 whereby to provide a seat for a coil spring 24 concentrically disposed about the link 25. The rear end of the coil spring 24 bears against the forward edge of the arm 22 of the tripper 20, whereby the same is biased for pivotal movement in a counter-clockwise direction about pintle 19, as viewed in Figure 1. The tripper 20 may also include a stop finger 27 depending therefrom and engageable with the forward wall of the opening or slot 17 whereby to limit pivotal movement of the tripper in a counter-clockwise direction under the influence of the spring 24. Thus, as clearly shown in Figure 1, the spring 24 biases the tripper 20 to an inoperative position wherein the dog 21 is out of engagement with the free end 18 of the spring 15.

In operation, a steady pull on the line 14 will normally do no more than move the dog 21 into engagement with the free end 18 of the spring 15. Thus, the lure 10 may be drawn through the water and the vane or vanes 12 will impart a suitable or desired erratic movement to the lure. However, if a sudden jerk or hard pull is imparted to the line 15, the dog 21 is operative to first flex and then release the free end of the spring 18 whereby to impart rapid vibrations of a resonant character to the same in a well known manner. In view of the damping effect of the surrounding water on the spring 15, such vibrations are of relatively short duration whereby the spring 24 returns the tripper 20 to the inoperative position. If desired, the parts may be so arranged that such return movement will also trip the free end 18 of the spring so as to impart resonant vibrations thereto on the return stroke of the tripper. At the same time, the actuating jerk or pull on the line 14 accelerates the forward movement of the lure whereby to increase the erratic movement of the same and visually attract the attention of fish while the vibrations of the spring are transmitted in all directions through the water to any fish within "hearing" distance. Obviously, by continuing the actuating pulls on the line 14, the spring 15 may be caused to vibrate at short intervals whereby to cause a virtually continuous broadcast of the resonant vibrations of the spring.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. A fish lure comprising a body, there being a first opening in said body extending longitudinally and transversely of the latter, said body having a second opening extending completely therethrough from the top to the bottom thereof and in communication with said first named opening, a leaf spring mounted in said body in said first opening and extending longitudinally for a portion of the length of the latter, said spring including a free end in spaced relation to the sides of said first opening, a tripper pivotally mounted in said second opening and movable for tripping engagement with said free end of said leaf spring to deflect and release the same to cause vibrations of said leaf spring, a fish line, means operatively connecting said tripper to said fish line whereby to impart tripping movement to said tripper in response to a pull on said fish line and resilient means operatively connected to said means for biasing said tripper out of tripping engagement with the free end of said leaf spring.

2. A fish lure comprising a body, there being a first opening in said body extending longitudinally and transversely of the latter, said body having a second opening extending completely therethrough from the top to the bottom thereof and in communication with said first named opening, a leaf spring mounted in said body in said first opening and extending longitudinally for a portion of the length of the latter, said spring including a free end in spaced relation to the sides of said first opening, a tripper pivotally mounted in said opening and movable for tripping engagement with said free end of said leaf spring to deflect and release the same to cause vibrations of said leaf spring, a fish line, a link operatively connecting said tripper to said fish line whereby to impart tripping movement to said tripper in response to a pull on said fish line, and a coiled spring circumposed about said link and operatively connected to said tripper and body for biasing said tripper out of tripping engagement with the free end of said leaf spring.

LEON R. MILLER.

REFERENCES CITED

The following references are of record in the file of this patent:

UNITED STATES PATENTS

| Number | Name | Date |
| --- | --- | --- |
| 242,590 | Bowen | June 7, 1881 |
| 2,038,460 | Weiss | Apr. 21, 1936 |
| 2,251,593 | Mangle | Aug. 5, 1941 |
| 2,341,234 | O'Byrne | Feb. 8, 1944 |